July 5, 1960  C. GOODMAN  2,943,694
METHOD AND APPARATUS FOR EXPLORING BOREHOLES
Filed May 17, 1954
FIG. 1
FIG. 2
FIG. 3
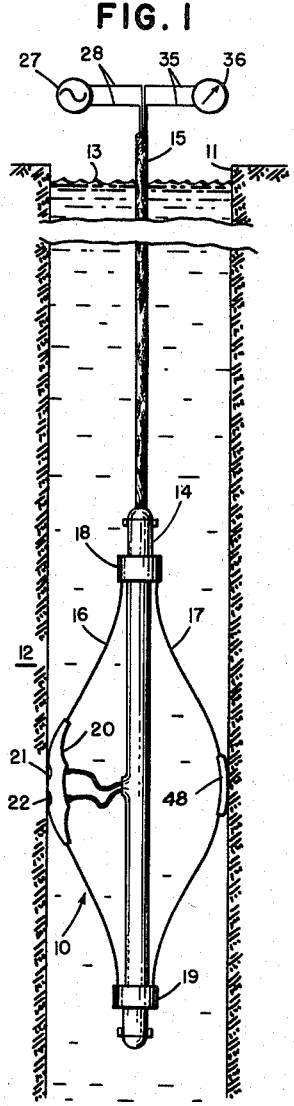
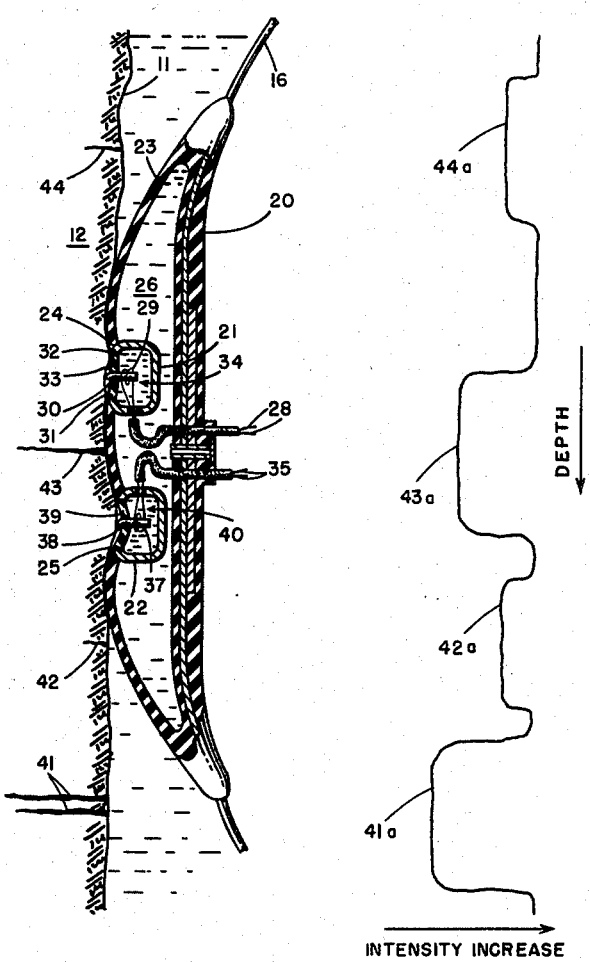
INTENSITY INCREASE
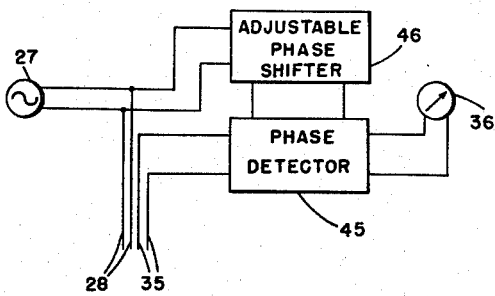
FIG. 4
*INVENTOR.*
CLARK GOODMAN
BY Robert Hockfield
HIS ATTORNEY United States Patent Office 2,943,694
Patented July 5, 1960

2,943,694

METHOD AND APPARATUS FOR EXPLORING BOREHOLES

Clark Goodman, Boston, Mass., assignor, by mesne assignments, to Schlumberger Well Surveying Corporation, Houston, Tex., a corporation of Texas Filed May 17, 1954, Ser. No. 430,138

7 Claims. (Cl. 181—.5)

This invention relates to methods and apparatus for exploring boreholes and, more particularly, pertains to new and improved methods and apparatus utilizing acoustical vibrational energy for determining selected qualities of the earth formations traversed by a borehole.

It is known that certain hard formations which are oil-bearing contain horizontal cracks or fissures through which the oil may seep into a borehole drilled into the earth. Manifestly, the exact location of these oil-bearing zones is of great commercial importance, since their productivity may often be increased by known fracturing techniques. However, in some cases, these cracks are so thin that detection by known methods may be difficult.

It is, therefore, an object of the present invention to provide new and improved methods and apparatus for locating cracks or fissures in the earth formations traversed by a borehole.

Heretofore, various types of acoustical devices have been proposed for exploring or logging earth formations traversed by a borehole. For example, an acoustic wave generator or transducer may be passed through the borehole and the acoustic impedance of the formations may be measured by observing the electrical impedance of the transducer. In another case, a transmitting transducer and a receiving transducer are passed through the borehole and may be utilized to determine the sound velocity and/or attenuation in the formations.

In general, these devices rely on compressional waves, i.e., vibrational waves in which the particle motion is perpendicular to the wave fronts. When such a wave encounters a thin liquid-filled fissure, there is little disturbance to the wave because the liquid resists compression and forces are transmitted across the fissure. It is thus apparent that this type of wave energy ordinarily is incapable of depicting fine details, and prior methods and apparatus usually may not be employed to indicate the presence of cracks in the formations.

Accordingly, it is another object of the present invention to provide new and improved methods and apparatus utilizing acoustical or vibrational energy for determining the presence of cracks or fissures in the earth formations traversed by a borehole.

A further object of the present invention is to provide new and improved methods and apparatus for estimating the size of cracks or fissures in the earth formations.

A method of exploring earth formations traversed by a borehole in accordance with the present invention comprises the steps of applying wave energy at a first location on the wall of the borehole and obtaining indications of the resulting shear wave energy at a second location on the wall of the borehole spaced from the first location. Thus, the presence of a crack or a fissure interposed between the first and second locations is evidenced by a change in a characteristic of the observed shear wave energy.

Apparatus for carrying out the method according to the present invention comprises a pair of transducers adapted to be passed through the borehole. Each transducer includes an active element, and means are provided for maintaining the active elements of the transducers in engagement with the wall of the borehole and for supporting the transducers in spaced relationship relative to one another. One transducer is excited or energized so that wave energy is applied by the active element thereof to the wall of the borehole, and means are provided for deriving an electrical signal representing a characteristic of shear wave energy intercepted by the active element of the other of the transducers. The apparatus further comprises means for obtaining indications of the derived electrical signal.

The novel features of the present invention are set forth with particularity in the appended claims. The present invention, both as to its organization and manner of operation, together with further objects and advantages thereof, may best be understood by reference to the following description taken in connection with the accompanying drawing in which:

Fig. 1 is a side elevation of a borehole instrument including apparatus capable of carrying out the method according to the present invention shown in operative position in a borehole;

Fig. 2 is a view in longitudinal section of a portion of the instrument illustrated in Fig. 1, drawn to an enlarged scale;

Fig. 3 represents a typical indication or log such as may be obtained by the apparatus shown in Figs. 1 and 2; and Fig. 4 represents a modification which may be made to the apparatus illustrated in Fig. 1.

As shown in Fig. 1 of the drawing, apparatus for carrying out the method in accordance with the present invention is included in a logging assembly 10 disposed in a borehole 11 which traverses earth formations 12. The borehole may be dry or it may contain a column of drilling liquid 13, such as a water base mud.

Logging assembly 10 comprises a tubular support 14 adapted to be lowered and raised in the borehole 11 on a supporting cable 15 by suitable means (not shown) located at the surface of the earth. Mounted on tubular support 14 is a spring cage assembly which may comprise, for example, a plurality of bowed springs 16 and 17, the opposite ends of which may be rigidly secured to a pair of collars 18 and 19, respectively, slidably mounted on the tubular member 14. The bowed spring 16 carries a wall engaging member or pad 20 which supports a pair of transducers 21 and 22. The bowed spring 17 may support another pad 48. With this construction, the forces on the assembly 10 are balanced symmetrically so that the tubular member 14 is maintained substantially centered in the borehole 11. In addition, the bowed springs 16 and 17 are preferably designed so as to exert substantially constant pressure between the pad 20 and the sidewall of the borehole regardless of the diameter of the borehole, thereby to maintain transducers 21 and 22 in engagement with the sidewall.

Sidewall engaging pad 20 may be of any conventional construction, serving to maintain transducers 21 and 22 in engagement with the wall of the borehole 11 and for supporting the transducers in a predetermined spaced relationship in a direction parallel to the longitudinal axis of the borehole, to be described more fully hereinafter.

Preferably, pad 20 is in the form of a hollow cushion constructed of a resilient material, such as rubber, in accordance with the teachings of the copending application of Andre Blanchard et al., Serial No. 295,996, filed June 27, 1952, now Patent No. 2,732,525, and assigned to the same assignee as the present invention.

As illustrated in detail in Fig. 2, hollow pad 20 includes a front face portion 23 provided with vertically spaced openings 24 and 25 which conform to the configuration of the transducers 21 and 22, respectively. Each transducer is sealed to the periphery of the associated opening in front face 23, and hollow pad 20 is substantially filled with a fluid 26, such as oil.

Transducer 21 may comprise any type of known arrangement for converting an alternating potential supplied by a source 27 (Fig. 1) located at the surface of the ear over conductors 28 of cable 15 to wave energy or mechanical vibrations. For example, transducer 21 may include a fixed coil 29 connected to conductors 28 and supported so as to receive a movable armature or active element 30. Armature 30 may be constructed of magnetic material and is permanently magnetized, or additional means (not shown) may be provided for providing a suitable magnetic field whereby currents in coil 29 produce corresponding movement of the armature 30. To support the armature 30, there is provided an annular member 31 of flexible material, such as rubber, fixed or suitably sealed to the periphery of an opening 32 in the front face of transducer 21. The armature 30 is sealed to the periphery of a central opening 33 in resilient member 31, and the interior of the transducer 21 is filled with a fluid 34, such as oil.

Transducer 22 may be of any well known construction for converting vibrational energy in which the particle motion is perpendicular to the longitudinal axis of borehole 11 to an electrical signal which is supplied over leads 35 to a suitable indicator 36 (Fig. 1) located at the surface of the earth. For example, this transducer may be similar to transducer 21. Accordingly, it includes a fixed coil 37, a movable armature or active element 38 and a resilient support 39 for the armature. In addition, transducer 22 is filled with a fluid 40, such as oil.

By means of spring 16, pad 20 and spring 17, active elements 30 and 38 of transducers 21 and 22 are maintained in engagement with the wall of the borehole.

The operating frequency for source 27 and the longitudinal spacing between active elements 30 and 38 of transducers 21 and 22 may be determined in view of the fact that the lateral depth of investigation of the apparatus depends primarily on the wave length of the vibrational energy supplied by transducer 21 and to a lesser extent on the separation between the transducers. In general, the maximum depth of investigation is approximately one wave length, and a typical shear wave velocity in sedimentary rock of 3.4 kilometers per second may be assumed. Thus, for a depth of investigation on the order of 0.3 meter, a frequency of 10 kilocycles per second may be employed together with a spacing in the neighborhood of 0.3 meter.

In operation, the borehole instrument 10 is passed through borehole 11 in a customary fashion, and through the agency of springs 16 and 17, active elements 30 and 38 are maintained in engagement with the sidewall of the borehole. Accordingly, the electrical signal from source 27 is converted to wave energy which is applied by active element 30 of transducer 21 to a first location on the wall of the borehole since an acoustical coupling between the active element and the wall is completed by direct contact. The resulting horizontal vibrations in formations 12 have a component of transverse motion which passes through the formation and causes movement of active element 38 of transducer 22 which is directly coupled to the sidewall. Vibration of this active element induces a signal in coil 37 which is transmitted to indicator 36.

By reason of the type of transducer employed, there is essentially no response to longitudinal wave energy and the derived signal is representative substantially only of shear wave energy. Thus, indications are obtained of wave energy having a component of motion transverse to the longitudinal axis of the borehole at a second location on the wall of the borehole spaced from the first location. The amplitude of the signal derived by transducer 22 is dependent upon a characteristic of the material in formations 12, as will be evident from the following discussion.

Since front face 23 of pad 20 is constructed of a resilient or rubberlike material, little direct transmission occurs between transducers 21 and 22. Moreover, as pointed out above, transducer 22 does not respond to longitudinal motion of the wall of the borehole. Thus, transducer 22 responds principally to wave energy transmitted through formations 12 as a transverse or shear wave.

When a shear wave, in which particle motion is parallel to the wave front, meets a fissure filled with water or oil, it is largely reflected because the liquid shears freely and no appreciable forces are transmitted across the fissure. Of course, if a fissure is not filled with a liquid, an incident shear wave is reflected as there is no transmission path directly across it. Accordingly, any cracks or fissures in the earth formations which are interposed in the transmission path for shear waves reduce the amplitude of the signal derived by transducer 22 as compared to instances wherein solid formation intervenes.

As the logging instrument 10 is passed through the borehole and the output of transducer 22 is recorded by indicator 36, a log such as represented in Fig. 3 may be obtained. This log is a plot of the amplitude of the output signal of transducer 22 versus depth of the logging instrument in the borehole. It will be observed that each time one of the illustrative cracks or fissures 41, 42, 43 and 44 is interposed between the transducers 21 and 22, a corresponding reduction in the intensity of the recorded signal may be observed at intervals 41a, 42a, 43a and 44a.

Furthermore, the degree of attenuation of the shear wave transmitted between transducers 21 and 22 is a function of the thickness and horizontal extent of the crank causing such attenuation. Thus, by calibration under known field conditions, such as may be obtained from measurements on core samples, or from simulated conditions in the laboratory, it is possible to obtain valuable information concerning the dimensions of the cracks 41—44 from the intensity of the recorded output of transducer 22, as may be evidenced by the differences in amplitude of indications 41a—44a.

It is therefore evident that the acoustical logging apparatus embodying the present invention may be utilized to determine certain acoustical properties of the earth formations traversed by a borehole so as to locate cracks or fissures. In addition, the acoustical properties of the fluid in the cracks may be utilized as a means of estimating their size. It is important to note that the source of acoustical energy 21 and the receiver 22 preferably should be acoustically insulated from one another and that shear wave transmission should occur solely between active elements 30 and 38. Such acoustical insulation may be provided in the manner described in Fig. 2, in which the acoustical insulating properties in rubber face 23 and fluid 26 are utilized. Alternatively, pad 20 may be filled with a suitable gas and a conventional pressure-compensating device employed to prevent the pressure of drilling fluid 13 from collapsing the pad. Similarly, the transducers 21 and 22 themselves may be filled with gas and provided with a suitable pressure-compensating device.

Increased discrimination against compression waves may be obtained by arranging the spacing and operating frequency so that the compression and shear waves are displaced in phase by 90° and employing phase selection. This may be accomplished by modifying the apparatus of Fig. 1 in the manner shown in Fig. 4. As illustrated, a phase detector 45 has one of its input circuits connected to the leads 35 which extend from transducer 22, and its other input circuit is supplied with the alternating signal generated by source 27 via an adjustable phase shifter 46. The output of phase detector 45 is fed to indicator 36.

The velocity of shear waves in most rocks is about 0.61 times the velocity of compression waves. At any given frequency, therefore, the wave length of the shear waves is about 0.61 times that of the compression waves. If the spacing between transducers 21 and 22 is 0.39 times the compression wave length, it is 0.64 times the shear wave length. The compression wave signal is delayed by 0.39 of a period and the shear wave signal is delayed by 0.64 of a period. Thus, the difference in delays is 0.25 of a period or 90°. Of course, other larger spacings may be employed to achieve this result in phasing.

In practice a 90° phase difference is not maintained exactly for a fixed spacing and fixed operating frequency since the velocities vary from formation to formation. However, assuming a typical shear wave velocity in sedimentary rock of 3.4 kilometers per second, if a spacing of 0.2 meter between transducers 21 and 22 is used, a frequency of 11 kilocycles per second should be employed to obtain the 90° relationship between the shear and compression waves described hereinbefore.

To condition the apparatus of Fig. 4 for operation, phase shifter 46 is adjusted so that the reference signal is essentially in phase with the shear wave signal at leads 35. Inasmuch as the compression wave signal is displaced 90° in phase from the reference signal, phase detector 45 is not responsive to the compression signal. The phase detector is primarily responsive to the amplitude of the shear wave signal intercepted by transducer 22 and a log is obtained at indicator 36.

If in the modified arrangement of Fig. 4 phase shifter 46 is omitted, another type of log may be derived. In this connection, the phase of the signal supplied by source 27 is used as a reference for continuously measuring the phase of the shear wave signals supplied over leads 35. In the log, cracks or fissures may be indicated and it may additionally provide a measurement of the acoustical reactance of the formations under investigation.

Although the apparatus embodying the present invention has been described in connection with the determination of cracks or fissures, it may have utility in a variety of applications. For example, by providing a suitably high operating frequency and close spacing between transducers 21 and 22, the depth of investigation may be made sufficiently small so that the log obtained is primarily indicative of the presence or absence of mud cake on the sidewall of borehole 11.

Moreover, transducers 21 and 22 may be spaced from one another in a plane transverse to the longitudinal axis of the borehole. In this way, the presence of vertical cracks or fissures may be more accurately indicated.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A method of exploring earth formations traversed by a borehole which comprises the steps of: generating a signal of reference frequency and phase; applying wave energy at a first location on the wall of the borehole having a fixed phase relation to said signal; and obtaining indications of the phase relationship between said signal and wave energy having a component of particle motion transverse to the longitudinal axis of the borehole at a second location on the wall of the borehole spaced from said first location, a distance providing a phase difference on the order of 90° between shear wave energy and compressional wave energy at said second location.

2. A method of exploring earth formations traversed by a borehole which comprises the steps of: generating a signal of reference frequency and phase; applying wave energy at a first location on the wall of the borehole having a fixed phase relation to said signal; intercepting wave energy transmitted through the earth formations to a second location on the wall of the borehole spaced from said first location, a distance providing a phase difference on the order of 90° between shear wave energy and compressional wave energy at said second location; and obtaining indications of the phase relationship between one signal displaced in phase by a preselected amount from said first-mentioned signal and another signal representing such intercepted wave energy whereby the presence of a crack or a fissure interposed between said first and said second locations may be determined.

3. Apparatus for exploring earth formations traversed by a borehole comprising a pair of transducers adapted to traverse the borehole, each of said transducers including an active element, means for maintaining said active elements of said transducers in engagement with the wall of the borehole and for supporting said transducers in fixed relationship to one another, means for exciting one of said transducers so that wave energy is applied by said active element thereof to the wall of the borehole, means for deriving an electrical signal representing wave energy intercepted by said active element of the other of said transducers, said transducers being spaced from one another a distance providing a phase difference on the order of 90° between shear wave energy and compressional wave energy at the zone of wall engagement of said other transducer, and means for obtaining indications substantially only is response to components of said electrical signal having a selected phase relative to wave energy emitted by said one transducer.

4. Apparatus for exploring earth formations traversed by a borehole comprising a pair of transducers adapted to traverse the borehole, each of said transducers including an active element, means for maintaining said active elements of said transducers in engagement with the wall of the borehole and for supporting said transducers in fixed relationship to one another, a signal source coupled to one of said transducers for exciting said active element thereof whereby wave energy is applied to one location on the wall of the borehole, the other of said transducers being spaced from said one transducer a distance providing a phase difference on the order of 90° between shear wave energy and compressional wave energy at the zone of wall engagement of said other transducer, a phase detector coupled to said other transducer and supplied with a reference signal having a substantially fixed phase relative to wave energy applied to the wall of the borehole at said one location, said phase detector including an output circuit providing an output signal responsive substantially only to the amplitude of wave energy intercepted by said other transducer having a selected phase relative to said reference signal, and an indicator coupled to said output circuit of said phase detector for obtaining indications of a characteristic of material interposed between said one location and the location of said other transducer.

5. Apparatus for exploring earth formations traversed by a borehole comprising a pair of transducers adapted to traverse the borehole, each of said transducers including an active element, means for maintaining said active elements of said transducers in engagement with the wall of the borehole and for supporting said transducers in fixed relationship to one another, a reference signal source for providing a signal of fixed frequency and phase, means for coupling said source to one of said transducers for exciting said active element thereof whereby wave energy is applied to the wall of the borehole, a phase detector having first and second input circuits and an output circuit, means for coupling the other of said transducers to said first input circuit of said phase detector, said other transducer being spaced from said one transducer a distance providing a phase difference on the order of 90° between shear wave energy and compressional wave energy at the zone of wall engagement of said other transducer, and thereby responsive substantially only to shear wave energy incident on said active element thereof, means for coupling said reference signal source to said second input circuit of said phase detector, and an indicator coupled to said output circuit of said phase detector.

6. Apparatus for exploring earth formations traversed by a borehole comprising a pair of transducers adapted to traverse the borehole, each of said transducers including an active element, means for maintaining said active elements of said transducers in engagement with the wall of the borehole and for supporting said transducers in fixed relationship to one another, a reference signal source for providing a signal of fixed frequency and phase, means for coupling said source to one of said transducers for exciting said active element thereof whereby wave energy is applied to the wall of the borehole, said transducers being spaced from one another a distance providing a phase difference on the order of 90° between shear wave energy and compressional wave energy at the zone of wall engagement of said other transducer, a phase detector having first and second input circuits and an output circuit, means for coupling the other of said transducers to said first input circuit of said phase detector, means including a phase shifting device for coupling said reference signal source to said second input circuit of said phase detector and adjusted so that said phase detector responds substantially only to a signal from said other transducer representing shear wave energy incident on said active element thereof, and an indicator coupled to said output circuit of said phase detector.

7. Apparatus for exploring earth formations traversed by a borehole, comprising a first acoustic transducer for developing acoustic signals at a first location in a borehole, means coupled to said first transducer for actuating said first transducer to develop an acoustic signal of a given reference frequency and phase in the earth formations adjacent thereto, a second acoustic transducer for detecting acoustic signals transmitted through the earth formations and being disposed at a second location spaced longitudinally from said first transducer, said acoustic signals being comprised of shear energy and compressional wave energy, means for spacing said transducers at a given distance from one another, said given distance being such that a phase difference of 90° exists between the signals due to shear wave energy and compressional wave energy, and means coupled to said first and second transducer means including means responsive to a selected difference in phase between the signal developed at the first location and the signal detected at the second location to provide indications of the presence of a crack or fissure located between said first and second locations.

References Cited in the file of this patent
UNITED STATES PATENTS

| | | |
|---|---|---|
| 2,191,120 | Slichter | Feb. 20, 1940 |
| 2,355,826 | Sharpe | Aug. 15, 1944 |
| 2,439,130 | Firestone | Apr. 6, 1948 |
| 2,592,135 | Firestone | Apr. 8, 1952 |
| 2,604,181 | Basham et al. | July 22, 1952 |
| 2,633,484 | Zimmerman | Mar. 31, 1953 |

OTHER REFERENCES

Heiland: "Geophysical Exploration," published by Prentice-Hall, Inc., New York, 1946, pages 441–442.